United States Patent

[11] 3,565,347

[72] Inventors Claude Denninger
Chemin des Greffieres, (69) St. Cyr-au-mt. d'or;
Maurice Confino, "Les Bageardes," (69) Chazay-d'Arergues, France
[21] Appl. No. 746,892
[22] Filed July 23, 1968
[45] Patented Feb. 23, 1971

[54] SECTIONAL SPRINKLING DEVICE
3 Claims, 8 Drawing Figs.

[52] U.S. Cl. ................................................. 239/556,
239/280, 239/532, 239/559, 239/563, 239/567, 239/579
[51] Int. Cl. .................................................. B05b 1/14
[50] Field of Search............................................ 239/280
(X), 286, 525, 532 (X), 548, 559 (X), 556, 560, 563(X), 566, 567(X), 568, 563

[56] References Cited
UNITED STATES PATENTS
| | | | |
|---|---|---|---|
| 2,784,032 | 3/1957 | Johansson | 239/566X |
| 3,434,522 | 3/1969 | Laurenty | 239/566X |

FOREIGN PATENTS
| | | | |
|---|---|---|---|
| 4,701,146 | 8/1937 | Great Britain | 239/563 |

*Primary Examiner*—Lloyd L. King
*Assistant Examiner*—Gene A. Church
*Attorney*—Dennison, Dennison, Townshend & Meserole

ABSTRACT: A sectional sprinkling head specifically for distribution of liquid pesticides and fertilizers having an elongated body with a coupling for connection to a source of fluid supply and a grating having sprinkling openings, the grating being removably secured to the body and the sprinkler having its effective length adjustable by means of opposed plunger-like piston plugs.

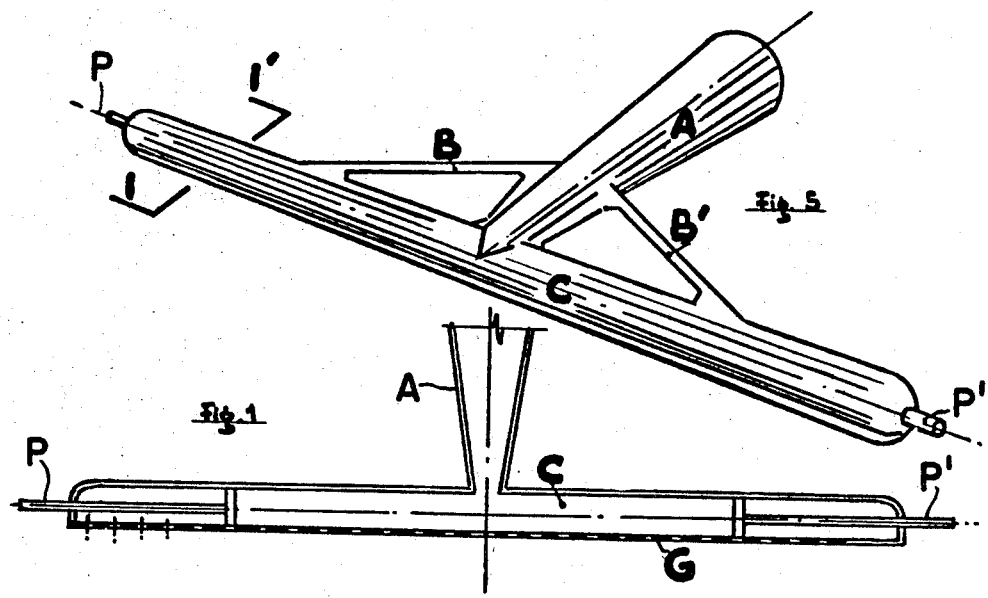
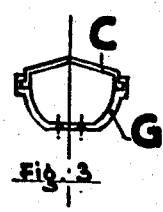
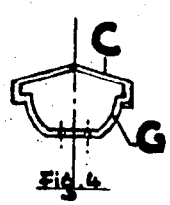
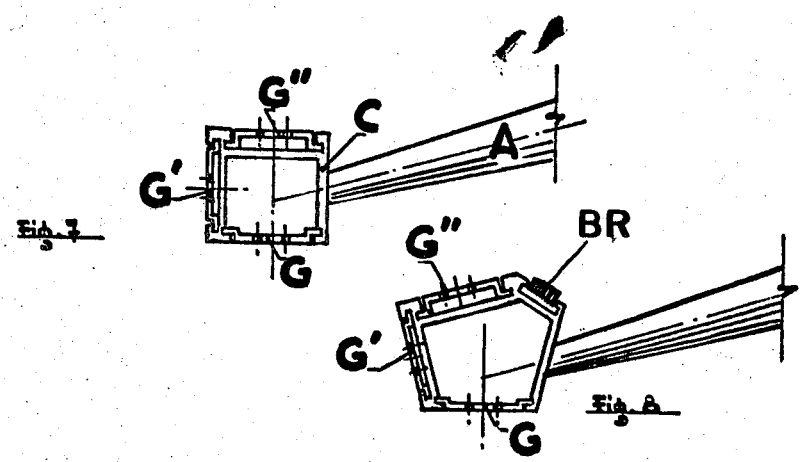

SECTIONAL SPRINKLING DEVICE

The present invention relates to an improved sectional sprinkling device, to be used in particular for distributing liquid herbicides and fertilizers over small and medium-sized areas, such as, for instance, private gardens and private or public parks. More generally, this invention will be useful to gardeners having to distribute or spread liquids evenly over areas, the sizes or shapes of which do not allow using conventional hauled sprinklers.

Among the known sprinkling devices, the most widely used is the conventional sprinkling rose, usually fitted to a watering-can. Its sprinkling surface is circular or oval, and provided with a great number of holes of varying diameters, and is more suitable for a quick (quantitative) distribution than for an even, controlled (qualitative) distribution.

Now, owing to the fact that pesticides, and in particular general or selective herbicides, are more and more in general use, new problems are set, which cannot be solved by the apparatus known heretofore. Firstly, it is necessary to spread a given quantity of active material as accurately as possible over the area to be treated, this point being particularly critical when using so-called selective herbicides, the selectivity of which is only effective for a duly predetermined dose, since with a double or larger dose there is a risk of serious damage to the plants on the ground treated. It is then necessary that said given quantity of active material be carried in a sufficient volume of water, depending on the moistness of the area to be treated. Lastly, it is necessary that the herbicidal composition be spread as uniformly as possible over said area, so as to clean it completely.

Now, a conventional sprinkling rose meets such requirements inadequately, because, due to its shape, it distributes inevitably more liquid over the central part of the strip of ground treated than over the side portions thereof.

Sprinklers are known, which are in the shape of cylindrical "banks" of a small diameter. They are advantageous in that they ensure a much better regularity and accuracy when treating areas such as those contemplated herein, but cleaning them after use is a difficult work.

Now, the cleaning problem is an important matter, owing to the fact that the sprinkling outlets may become choked for many reasons. On the other hand, the water used is not always very clean, because it comes often from springs, or wells or tanks, and it is liable to contain suspended small solid particles. On the other hand, products such as herbicides are generally not used in the pure state, but as compositions including in particular inert fillers, the particle size of which is not always wholly uniform, so that there is a risk of the sprinkling outlets becoming likewise choked thereby.

In the case of a conventional sprinkling rose, choking is only a minor problem, since in such a rose many outlets are aligned along the same line parallel to the operating axis. On the contrary, in the case of a sprinkling bank, wherein the outlets are aligned along one or two lines normal to the operating axis, one of said outlets becoming choked creates of necessity on the ground one or more untreated strips, in which the weeds will not be destroyed.

Furthermore, while it is comparatively easy to clear the outlets by means, for instance, of a pin pushing back the foreign materials inside the apparatus, it will be much more difficult to remove same from the apparatus body and, if the latter is not thoroughly cleaned, such a mishap will occur repeatedly, resulting in a loss of time and nervous irritation for the user.

Lastly, a sprinkling device is likely to be used not only for applying herbicidal compositions, but also for watering, or for spreading liquid fertilizers or pesticides such as fungicides, nematicides or insecticides. Consequently, the sprinkling device should always be thoroughly cleaned, as the herbicidal activity of the products now in use is such that they may be the cause of serious damage, even when applied in infinitely small doses.

The main object of the present invention is to provide a sprinkling device obviating the drawbacks mentioned hereinabove. To this end, a sprinkling device according to the invention comprises an elongated body provided with a coupling for connection to a source of supply, and a lower portion or "grating" provided with sprinkling outlets, said grating being removably secured to said body, whereby said device is adapted to be cleaned much more quickly and thoroughly after use. Furthermore, the removable character of said grating allows providing said sprinkling device with a set of gratings having outlets, the number and diameters of which are different, depending on the kind of work to be effected.

Thus with a 50 cm long grating provided with 150 outlets of a diameter of 1 mm, distributed in two parallel rows, an operator is able to treat completely a 25 sq. m. area, while using only 10 litres of liquid. If the ground to be treated is already wet, a grating provided with 75 outlets only can be used, which will enable an area twice as large, that is, 50 sq. m., to be treated. After washing this latter grating, the operator can use it for difficult jobs, such as watering seed-plots, where it is preferred not to "ram" the earth with a substantial quantity of liquid poured quickly. For conventional watering operations, the operator may use, for instance, a grating having 150 holes of a diameter of 2 mm, which will enable him to spread water quickly, at the rate of about 1 litre per square metre, which is the usual dose when using a conventional sprinkling rose.

The shape and size of the sprinkling device according to the invention may be varied very widely. It may have any section, such as square, triangular, rectangular, oval, or circular. The length of said device is normally about 1 or 2 feet, but may be from 3 to 7 feet when the device is to be fixed, for instance, to a watering cart. The grating and the body of the device of the invention are made of the same material, or of different materials, including various metals and the alloys thereof, plastics materials, and the like.

The useful length of said device is adapted to be adjusted by means of plungerlike plugs or removable packing pieces adapted to be positioned inside the device body. Such length adjustment is advantageous when treating very narrow areas, such as, for instance, footways in vegetable gardens.

To make the operator's work as easy as possible, and to limit the risk of gratings being lost, the body of the sprinkling device of the invention may include suitable arrangements enabling interchangeable gratings to be fixed thereto, in which case it is advisable to give said body a shape having a sufficient number of flat surfaces to enable such spare gratings to be secured easily thereon.

If desired, the sprinkling outlets may be designed in a manner such as to project from the surface of the grating, so as to enable the thin liquid jets to remain mutually parallel, and to obtain a still better distribution of the liquid on the ground.

The coupling provided on the body of said device for feeding the latter with liquid, may be located in the middle or at one of the ends thereof. Central feed is advantageous in that the liquid is better distributed inside the sprinkling device. On the other hand, feeding through one of the device ends enables the operator not to trample down the area just treated.

An embodiment of the sprinkling device according to the invention will now be described, merely by way of example, with reference to the appended drawing, in which:

FIG. 1 is a longitudinal sectional view of a sprinkling device according to the invention, showing means for adjusting the useful length thereof;

FIG. 2 is a cross section along line I–I' of FIG. 5, showing a method for securing a grating to the body of said device;

FIGS. 3 and 4 are FIGS. similar to FIG. 2, but showing other methods for securing said grating to said body;

FIG. 5 is a perspective top view of a sprinkling device according to the invention;

FIG. 6 is a top plan view of one of the gratings adapted to be used with said device;

FIGS. 7 and 8 are cross sections of a device body adapted to carry spare gratings.

With reference now to the FIGS., a sprinkling device according to the invention includes an elongated body C provided with a feed coupling A, which, when said device is designed to be fitted on a watering-can, is conical, and has inner ribs intended for providing a seal. Struts B, B', stiffen the feed coupling-body assembly. Said struts can be omitted, but they are particularly advantageous when the whole assembly is made of plastics material.

The removable lower portion or grating G of said device is adapted to be secured to the body C by any suitable method, such as boxing by means of tenons and mortices, fitting into grooves previously formed inside the device body, and the like, as shown in FIG. 2, 3, and 4. Said grating G is provided at both its ends with tongues T, T', which make its removal easier.

The useful length of said sprinkling device is adjustable by means, for instance, of plunger like plugs P, P', located inside the body C, as shown in FIG. 1.

To make said device fully liquidtight after the assembling thereof, the body C is made of hard plastics material, while the grating G is made of flexible plastics material, so as to obtain a force fit preventing any leak.

As shown in FIGS. 7 and 8, the body C of said device may be provided with a sufficient number of flat surfaces and suitable fixing means to enable removable spare gratings G', G'', to be secured to said body.

Furthermore, said body may be provided with an arrangement for securing a small brush BR, that the operator will thus have always near at hand for clearing or cleaning the gratings, as shown in FIG. 8.

The sprinkling device according to the invention is, of course, adapted to be used with any source of liquid, and any feed means suitable for the work to be effected. Thus it may be connected to a stationary or movable tank, either directly, or through the medium of a hose. It may also be connected with the water distribution system. In each such case, the feed coupling A will be provided with a suitable connection.

Obviously, the invention is not limited to the sole embodiment thereof described hereinabove, by way of example only. It covers, on the contrary, all modifications thereof falling within the scope of the appended claims.

We claim:

1. A sprinkler head distributing distributing liquid pesticides, fertilizers and the like comprising an elongated hollow body having a coupling at right angles to the axis of said body for connection with a supply of material, said body having a lower open portion, a removable plate adapted to be removably secured within and closing said lower portion, said plate being provided with sprinkling outlets therein, and at least one additional plate having sprinkling outlets therein of a size or configuration different from said first-named plate and means on said elongated body for storing the alternate plate.

2. A sprinkling device as defined in claim 1, and further including means slidably positioned along the axis of said elongated body to adjust the useful length of said sprinkler.

3. A sprinkling device as defined in claim 2, wherein said means for adjusting the useful length of said sprinkler including a pair of opposed elongated rods having piston like plungers attached to the inner ends thereof and being slidable within said elongated body.